(12) United States Patent
Kim et al.

(10) Patent No.: US 10,696,557 B2
(45) Date of Patent: Jun. 30, 2020

(54) APPARATUS AND METHOD FOR MANUFACTURING AEROGEL SHEET

(71) Applicant: LG CHEM, LTD., Seoul (KR)

(72) Inventors: Ye Hon Kim, Daejeon (KR); Je Kyun Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 192 days.

(21) Appl. No.: 15/736,736

(22) PCT Filed: Feb. 3, 2017

(86) PCT No.: PCT/KR2017/001219
§ 371 (c)(1),
(2) Date: Dec. 14, 2017

(87) PCT Pub. No.: WO2017/142238
PCT Pub. Date: Aug. 24, 2017

(65) Prior Publication Data
US 2018/0354805 A1  Dec. 13, 2018

(30) Foreign Application Priority Data
Feb. 16, 2016 (KR) .......................... 10-2016-0017998

(51) Int. Cl.
*B05C 3/132* (2006.01)
*C01B 33/158* (2006.01)
(Continued)

(52) U.S. Cl.
CPC ....... *C01B 33/1585* (2013.01); *B01J 13/0091* (2013.01); *B01J 27/24* (2013.01); *B01J 31/02* (2013.01); *B01J 31/0202* (2013.01); *B01J 35/12* (2013.01); *B01J 37/04* (2013.01); *B05C 3/125* (2013.01); *B05C 3/132* (2013.01); *B65H 16/10* (2013.01); *B65H 18/08* (2013.01); *B65H 20/02* (2013.01); *B65H 20/06* (2013.01); *B65H 37/00* (2013.01); *D06B 3/10* (2013.01);
(Continued)

(58) Field of Classification Search
None
See application file for complete search history.

(56) References Cited

U.S. PATENT DOCUMENTS

| 5,084,349 A | 1/1992 | Sasaki et al. |
| 5,789,075 A | 8/1998 | Frank et al. |

(Continued)

FOREIGN PATENT DOCUMENTS

| CN | 101244825 | 8/2008 |
| CN | 100540257 | 9/2009 |

(Continued)

*Primary Examiner* — Nathan T Leong
(74) *Attorney, Agent, or Firm* — Dentons US LLP (57) ABSTRACT

The present invention relates to a method for manufacturing an aerogel sheet and comprises: a step (a) of impregnating an acid solution into a fiber sheet to clean the fiber sheet by using the acid solution and impregnating a binder solution into the fiber sheet that is cleaned by using the acid solution to manufacture a pre-processed fiber sheet; a step (b) of impregnating a silica precursor into the pre-processed fiber sheet; and a step (c) of a gelling catalyst into the fiber sheet into which the silica precursor is impregnated to gelate the silica precursor.

17 Claims, 4 Drawing Sheets

(51) Int. Cl.

| | | |
|---|---|---|
| *B65H 20/06* | (2006.01) | |
| *B65H 37/00* | (2006.01) | |
| *B65H 16/10* | (2006.01) | |
| *B65H 18/08* | (2006.01) | |
| *B01J 37/04* | (2006.01) | |
| *B01J 13/00* | (2006.01) | |
| *B01J 31/02* | (2006.01) | |
| *B01J 27/24* | (2006.01) | |
| *B01J 35/12* | (2006.01) | |
| *B05C 3/12* | (2006.01) | |
| *B65H 20/02* | (2006.01) | |
| *D06B 3/10* | (2006.01) | |
| *D06B 5/22* | (2006.01) | |
| *D06M 11/60* | (2006.01) | |
| *D06M 13/507* | (2006.01) | |
| *D06M 15/333* | (2006.01) | |
| *D06M 15/347* | (2006.01) | |

(52) U.S. Cl.
CPC ........... *D06B 5/22* (2013.01); *D06M 11/60* (2013.01); *D06M 13/507* (2013.01); *D06M 15/333* (2013.01); *D06M 15/347* (2013.01); *D06M 2400/02* (2013.01)

(56) References Cited

U.S. PATENT DOCUMENTS

| | | | |
|---|---|---|---|
| 6,054,177 A | 4/2000 | Endoh et al. | |
| 6,139,956 A | 10/2000 | Endoh et al. | |
| 6,319,852 B1 | 11/2001 | Smith et al. | |
| 6,989,123 B2 | 1/2006 | Lee et al. | |
| 7,399,439 B2 | 7/2008 | Lee et al. | |
| 7,780,890 B2 | 8/2010 | Lee et al. | |
| 9,862,614 B2 | 1/2018 | Oh et al. | |
| 2005/0046086 A1 * | 3/2005 | Lee | B29C 39/14 |
| | | | 264/444 |
| 2005/0167891 A1 | 8/2005 | Lee et al. | |
| 2006/0286813 A1 | 12/2006 | Meredith et al. | |
| 2007/0148435 A1 | 6/2007 | Meredith et al. | |
| 2008/0093016 A1 | 4/2008 | Lee et al. | |
| 2008/0292889 A1 | 11/2008 | Harvey et al. | |
| 2011/0223329 A1 | 9/2011 | Meredith et al. | |
| 2011/0240907 A1 | 10/2011 | Sharma et al. | |
| 2012/0025127 A1 | 2/2012 | Yeo et al. | |
| 2013/0296596 A1 | 11/2013 | Suh et al. | |
| 2016/0264427 A1 | 9/2016 | Oh et al. | |

FOREIGN PATENT DOCUMENTS

| | | | |
|---|---|---|---|
| CN | 101671030 | | 3/2010 |
| CN | 101698583 | | 4/2010 |
| CN | 101973752 | | 2/2011 |
| CN | 102557577 | | 7/2012 |
| CN | 102557577 | * | 3/2014 |
| CN | 104528727 | | 4/2015 |
| EP | 0359636 | | 3/1990 |
| EP | 0834384 | | 4/1998 |
| JP | 2007-524528 | | 8/2007 |
| JP | 2008195851 | | 8/2008 |
| JP | 2011190551 | | 9/2011 |
| JP | 2016017255 | | 2/2016 |
| KR | 10-2011-0082379 | | 7/2011 |
| KR | 10-2011-0126381 | | 11/2011 |
| KR | 10-1105436 | | 1/2012 |
| KR | 10-2012-0012836 | | 2/2012 |
| KR | 1020110126381 | * | 5/2012 |
| KR | 10-2012-0070948 | | 7/2012 |
| KR | 10-1199958 | | 11/2012 |
| KR | 10-2013-0123942 | | 11/2013 |
| KR | 10-2014-0146814 | | 12/2014 |
| KR | 10-2015-0089319 | | 8/2015 |
| KR | 10-2015-0090320 | | 8/2015 |
| KR | 101717833 | | 3/2017 |
| WO | 2010080237 | | 7/2010 |
| WO | 2010143902 | | 12/2010 |

* cited by examiner

| | AEROGEL DENSITY (kg/m³) | EXISTENCE AND NONEXISTENCE OF PRE-PROCESSING | AEROGEL CONTENT WITHIN FIBER SHEET (wt%) | THERMAL CONDUCTIVITY (mW/m K) | DUST MEASUREMENT (WEIGHT REDUCTION RATE WT%) |
|---|---|---|---|---|---|
| EMBODIMENT | 40 | o | 35 | 13.5 | 5.4 |
| COMPARATIVE EXAMPLE | 40 | x | 27 | 17.0 | 10.5 |

FIG.4

APPARATUS AND METHOD FOR MANUFACTURING AEROGEL SHEET

CROSS-REFERENCE TO RELATED APPLICATION

This application is a National Stage Application of International Application No. PCT/KR2017/001219 filed on Feb. 3, 2017, which claims priority to and the benefit of Korean Patent Application No. 10-2016-0017998, filed on Feb. 16, 2016, both of which are incorporated herein in their entirety by reference for all purposes as if fully set forth herein.

TECHNICAL FIELD

The present invention relates to an apparatus and method for manufacturing an aerogel sheet, and more particularly, to an apparatus and method for manufacturing an aerogel sheet having excellent thermal insulation and durability and a uniform thickness.

BACKGROUND ART

In general, aerogel is a high porosity material having high porosity of about 90% to about 99% in solids that are known up to date. A silica precursor solution is subjected to sol-gel polymerization reaction to prepare gel, and then, a drying process is performed on the prepared gel under supercritical or atmospheric conditions to obtain the aerogel. That is, the aerogel has a pore structure filled with air.

Such the aerogel is lightweight and has physical properties such as heat insulation and sound absorption due to the unique pore structure in which 90% to 99% of an internal space is empty. The greatest advantage of the above-described advantages is the high heat insulation having thermal conductivity of 30 mW/m·k or less, which is significantly lower than thermal conductivity of 36 mW/m·k that is thermal conductivity of an organic insulation material such as conventional Styrofoam and the like.

DISCLOSURE OF THE INVENTION

Technical Problem

There are problems that the aerogel sheet according to the related art has a nonuniform thickness and poor heat insulation and durability.

The present invention has been made to solve the above-mentioned problems, and an object of the prevent invention is to provide an apparatus and method for manufacturing an aerogel sheet having excellent heat insulation and durability and a uniform thickness.

Technical Solution

To achieve the above-described object, a method for manufacturing an aerogel sheet according to the present invention comprises: a step (a) of impregnating an acid solution into a fiber sheet to clean the fiber sheet by using the acid solution and impregnating a binder solution into the fiber sheet that is cleaned by using the acid solution to manufacture a pre-processed fiber sheet; a step (b) of impregnating a silica precursor into the pre-processed fiber sheet; and a step (c) of a gelling catalyst into the fiber sheet into which the silica precursor is impregnated to gelate the silica precursor.

In the step (a), the fiber sheet may be cleaned by using the acid solution while being dipped into a cleaning container in which the acid solution is stored, and the pre-processed sheet may be manufactured while the fiber sheet that is cleaned by using the acid solution is dipped into a binder impregnation container in which the binder solution is stored.

An organic impregnation solution that is poly vinyl alcohol (PVA) and poly vinyl butyral (PVB) or an inorganic impregnation solution that is silica sol may be used as the binder solution.

The step (a) may further comprise a step of drying the fiber sheet into which the binder solution is impregnated.

In the step (b), tetraethyl orthosilicate (TEOS) and ethanol may be mixed to prepare the silica precursor.

The tetraethyl orthosilicate (TEOS) may comprise hydrolyzed TEOS.

In the step (c), ethanol and ammonia water ($NH_4OH$) may be mixed to prepare the gelling catalyst.

In the step (b), the pre-processed fiber sheet may be dipped into a precursor impregnation container in which the silica precursor is stored to impregnate the silica precursor into the fiber sheet.

The step (c) may be performed within a conveyor belt that transfers the fiber sheet, in which the silica precursor is impregnated, from one side to the other side thereof.

The conveyor belt may comprise a scraper comprising a first scraper adjusting a thickness of the silica precursor injected to the surface of the pre-processed fiber sheet and a second scraper adjusting a thickness of the gelling catalyst injected to the surface of the fiber sheet into which the silica precursor is impregnated.

In the step (c), the gelling catalyst may be injected to the surface of the fiber sheet, into which the silica precursor is impregnated, at a rate of 0.035 L/min to 0.012 L/min to leave the gelling catalyst for 8 minutes to 12 minutes and thereby to gelate the silica precursor.

After the step (c), the method may further comprise a step (d) of aging the fiber sheet in which the silica precursor is gelated.

In the step (d), the fiber sheet in which the silica precursor is gelated may be aged for 50 minutes at a temperature of 70° C.

In the step (d), the fiber sheet in which the silica sol is gelated may be left at room temperature for 10 minutes to perform the aging.

After the step (d), the method may further comprise a step (e) of injecting a coating solution to the aged fiber sheet to modify a surface of the fiber sheet.

After the step (e), the method may further comprise a step (f) of drying the fiber sheet of which the surface is modified.

The step (f) may comprise a first drying step of injecting carbon dioxide at a rate of 70 L/min for ten minutes under environments of a temperature of 28° C. and a pressure of 70 bar to dry the fiber sheet of which the surface is modified, a second drying step of raising to a temperature of 50° C. for 1 hour and 20 minutes to dry the fiber sheet again, a third drying step of injecting carbon dioxide at a rate of 0.7 L/min for 20 minutes under a temperature of 50° C. and a pressure of 150 bar to dry the fiber sheet, and a fourth drying step of injecting carbon dioxide at a rate of 0.7 L/min for 20 minutes after breaking for 20 minutes to dry the fiber sheet.

In the third drying step of the step (f), the ethanol generated from the fiber sheet of which the surface is modified may be collected while injecting the carbon dioxide.

The step (f) may further comprise a step of discharging the carbon dioxide for 2 hours after the fourth drying step.

An apparatus for performing the method for manufacturing the aerogel sheet comprises: a supply roller around which a fiber sheet is wound in the form of a roll; a cleaning container in which an acid solution, into which the fiber sheet supplied from the supply roller is dipped to be cleaned by using the acid solution, is stored; a binder impregnation container in which a binder solution, into which the fiber sheet that is cleaned by using the acid solution is dipped to improve absorption of the fiber sheet, is stored; a drying member drying the fiber sheet into which the binder solution is impregnated; a silica impregnation container in which a silica precursor, into which the dried fiber sheet is dipped to impregnate the silica precursor into the fiber sheet, is stored; a conveyor belt transferring the fiber sheet, into the silica precursor is impregnated, from one side to the other side thereof; a catalyst supply member injecting a gelling catalyst to a surface of the fiber sheet disposed on the conveyor belt to impregnate the gelling catalyst into the fiber sheet; a collection roller winding the fiber sheet, which is transferred up to the other side by the conveyor belt, in the form of a roll; and a reaction container which accommodates the roll-shaped fiber sheet collected by the collection roller and in which the accommodated fiber sheet is aged, surface-modified, and dried at a high temperature.

Advantageous Effects

The present invention has effects as follows.

First: the acid solution and the binder may be impregnated into the fiber sheet to perform a pre-processing process, and then, the silica precursor and the gelling catalyst may be impregnated to manufacture the aerogel sheet having the excellent insulation and durability, particularly, having the uniform thickness.

Second: according to the present invention, the tetraethyl orthosilicate (TEOS) and the ethanol may be mixed to obtain the silica precursor having the high quality.

Third: according to the present invention, the hydrolyzed TEOS may be used to obtain the silica precursor having the high quality.

Fourth: according to the present invention, the ethanol and the ammonia water ($NH_4OH$) may be mixed to obtain the gelling catalyst having the high quality.

Fifth: according to the present invention, the conveyor belt for transferring the blanket from one side to the other side thereof may be used to achieve the continuity of the operation and the simplification of the process.

Sixth: according to the present invention, the scraper may be provided on the conveyor belt to uniformly adjust the thickness of the silica precursor or the gelling catalyst.

Seventh: according to the present invention, the fiber sheet in which the silica precursor is gelated may be aged and dried after being surface-modified to obtain the aerogel sheet having the high quality.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

Figure 1:
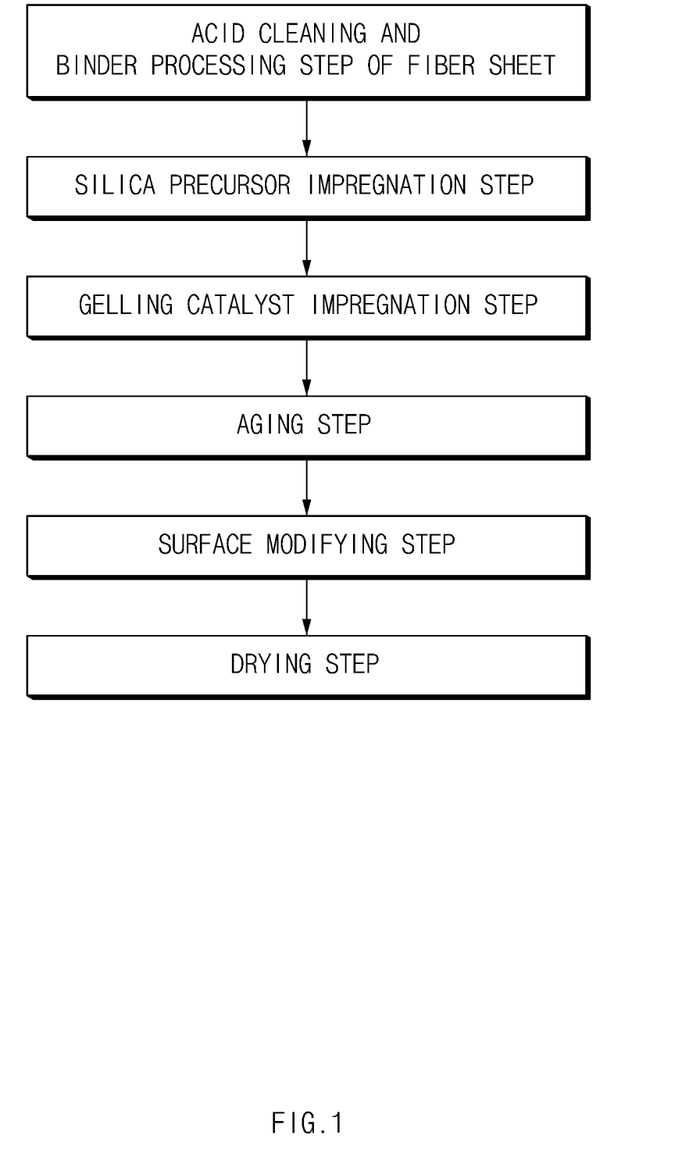
FIG. 1 is a flowchart illustrating a method for manufacturing an aerogel sheet according to the present invention.

A method for manufacturing an aerogel sheet according to the present invention comprises, as illustrated in FIG. 1, a step (a) of pre-processing a fiber sheet, a silica precursor impregnation step (b) of impregnating a silica precursor into the pre-processed fiber sheet, a silica precursor gelation step (c) of impregnating a gelling catalyst into the fiber sheet in which the silica precursor is impregnated to gelate the silica precursor, an aging step (d) of aging the fiber sheet in which the silica precursor is gelated, a surface modifying step (e) of injecting a coating solution into the aged fiber sheet to modify a surface of the fiber sheet, and a drying step (f) of drying the fiber sheet of which the surface is modified.

Hereinafter, the method for manufacturing the aerogel sheet according to the present invention will be described in more detail.

Figure 2:
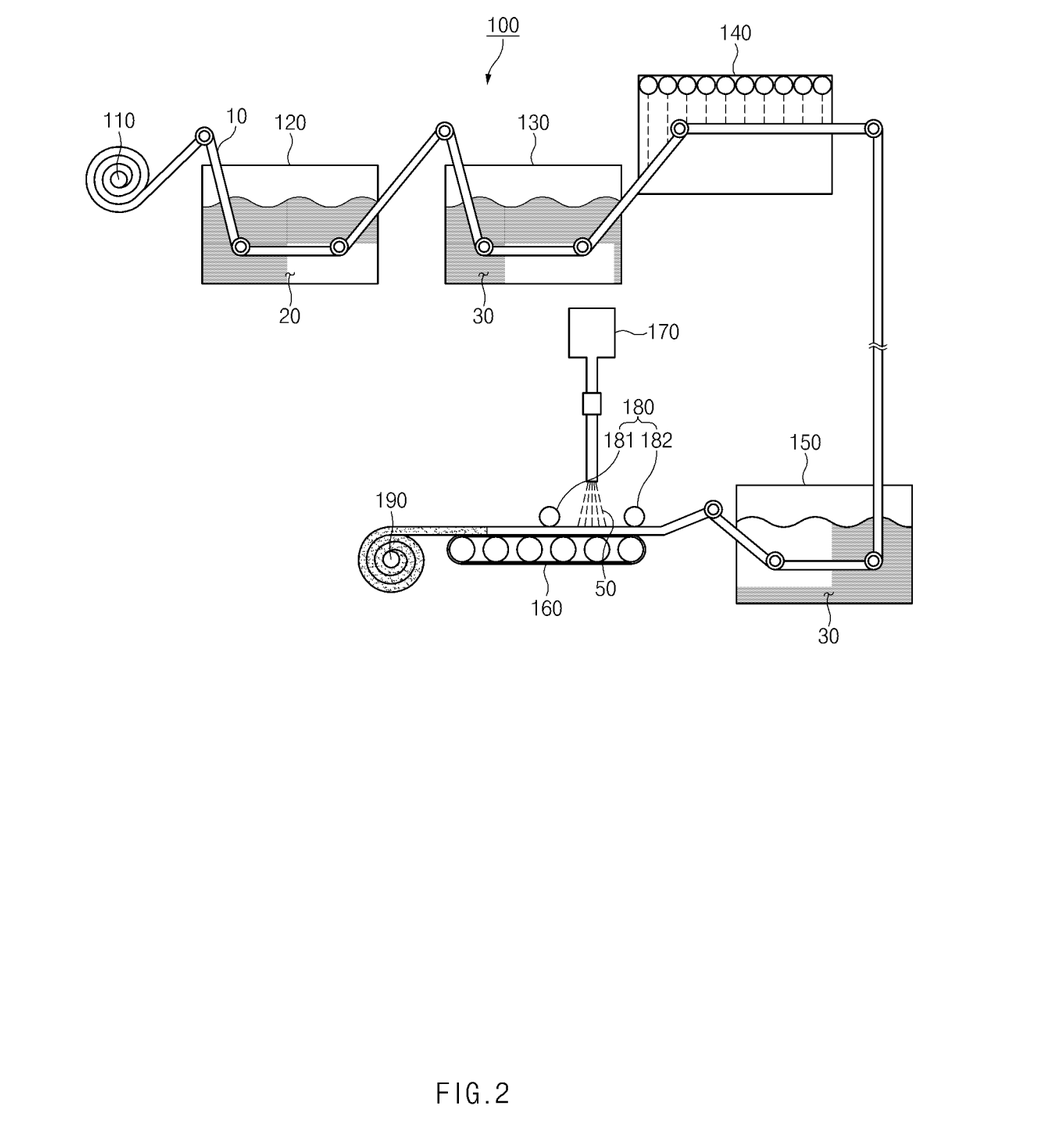
FIG. 2 is a view illustrating an apparatus of manufacturing the aerogel sheet according to the present invention.

FIG. 2 is a view illustrating an apparatus 100 for manufacturing an aerogel sheet, in which the fiber sheet pre-processing step (a), the silica precursor impregnation step (b), and the silica precursor gelation step (c) are performed.

That is, as illustrated in FIG. 2, the apparatus 100 for manufacturing the aerogel sheet comprises a supply roller 110 around which a fiber sheet 10 is wound in the form of a roll, a cleaning container 120 in which an acid solution 20 is stored so that the acid solution 20 is impregnated while the fiber sheet 10 supplied from the supply roller 110 is dipped, a binder impregnation container 130 in which a binder 30 is impregnated while the fiber sheet 10 passing through the cleaning container 120 is dipped, a drying member 140 for drying the fiber sheet 10 passing through the binder impregnation container 130 to manufacture a pre-processed fiber sheet 10, a silica precursor impregnation container 150 in which the silica precursor 40 is impregnated while the pre-processed fiber sheet 10 is dipped, a conveyor belt 160 for transferring the fiber sheet 10 passing through the silica precursor impregnation container 150 from one side to the other side thereof, a catalyst supply member 170 for injecting a gelling catalyst 50 to a surface of the fiber sheet 10 in which the silica precursor is impregnated and which is disposed on the conveyor belt 160 to gelate the silica precursor, and a collection roller 190 for winding the fiber sheet 10 transferred up to the other side by the conveyor belt 160 in the form of the roll to collect the fiber sheet 10.

Here, the acid solution cleaning container 120 has a water tank shape to store an acid solution 20 having a constant acidity (ph) therein. That is, in the acid solution cleaning container 120, the fiber sheet 10 is cleaned by using the acid solution 20 while being dipped into the acid solution 20. The surface of the fiber sheet that is cleaned by using the acid solution may be induced to be etched and then activated. As a result, the fiber sheet 10 may increase in porosity and surface roughness to improve attachment performance of the silica precursor.

The binder impregnation container 130 may have a water tank shape to store a binder solution 30 therein. That is, in the binder impregnation container 130, the fiber sheet 10 that is cleaned by using the acid solution may be dipped into the binder solution 30 to more improve the attachment performance of the silica precursor.

The drying member 140 dries the fiber sheet in which the binder solution is impregnated to complete the pre-processed fiber sheet. The drying member 140 comprises a drying container through which the fiber sheet 10 in which the binder solution is impregnated passes and a heating part provided in the drying container to generate heat and thereby to dry the fiber sheet 10 in which the binder solution is impregnated and which passes through the inside of the drying container.

The silica precursor impregnation container 150 may have a water tank shape to store the silica precursor 40 therein. That is, in the silica precursor impregnation container 150, the silica precursor 40 is impregnated into the surface of the fiber sheet 10 while the pre-processed fiber sheet 10 is dipped into the silica precursor 40.

The conveyor belt 160 transfers the fiber sheet 10 passing through the silica precursor impregnation container 150 up to the collection roller 190. Here, a scraper 180 for uniformly adjusting a thickness of each of the silica precursor 40 impregnated in the fiber sheet 10 and the gelling catalyst 50 is disposed on the conveyor belt 160. The scraper 180 comprises a first scraper 181 uniformly adjusting a thickness of the silica precursor 40 impregnated into the fiber sheet 10 and a second scraper 182 uniformly adjusting a thickness of the gelling catalyst 50 injected to the surface of the fiber sheet 10.

The catalyst supply member 170 injects the gelling catalyst to the fiber sheet 10 passing through the conveyor belt 160 to gelate the silica precursor 40. The catalyst supply member 170 comprises a catalyst storage container provided in the conveyor belt 160 to store the gelling catalyst 50, an injection nozzle injecting the gelling catalyst stored in the catalyst storage container to the fiber sheet 10, and a pump controlling an injection amount of gelling catalyst injected from the injection nozzle.

The step (a) of pre-processing the fiber sheet, the silica precursor impregnation step (b), and the silica precursor gelation step (c), which are performed through the apparatus for manufacturing the aerogel sheet comprising the above-described constituents according to the present invention, will be described in detail.

(a) Step of Pre-Processing Fiber Sheet

The step (a) of pre-processing the fiber sheet is a step of preparing the pre-processed fiber sheet and comprises an acid cleaning pre-processing step (a-1), a binder impregnation step (a-2), and a binder drying step (a-3).

In the step (a-1), the fiber sheet 10 supplied from the supply roller 110 is dipped into the cleaning container 120 in which an acid solution 20 is stored. Thus, the acid solution 20 may be impregnated into the fiber sheet 10 to induce etching of the surface of the fiber sheet 10 and thereby to activate the surface, thereby increasing porosity and improving attachment performance of the silica precursor.

Here, the acid solution may have a constant acidity (ph) to uniformly clean the entirety of the fiber sheet 10 by using the acid solution.

In the step (a-2), the fiber sheet 10 that is cleaned by using the acid solution is dipped into the binder impregnation container 130 in which the binder solution 30 is stored. Thus, while the binder solution 30 is impregnated into the fiber sheet 10 to improve absorption of the fiber sheet 10, and also, the impregnation of the silica precursor 10 may be more improved through the absorption of the silica precursor 40.

Here, an organic impregnation solution that is poly vinyl alcohol (PVA) and poly vinyl butyral (PVB) or an inorganic impregnation solution that is silica sol may be used as the binder solution 30.

The step (a-3) is a step of drying the fiber sheet in which the binder solution is impregnated. Here, the fiber sheet 10 in which the binder solution is impregnated is dried by high-temperature heat while passing through the drying member 140.

When the above-described steps are completed, the pre-processed fiber sheet may be prepared.

(b) Silica Precursor Impregnation Step

In the silica precursor impregnation step (b), the pre-processed fiber sheet 10 is dipped into the silica precursor impregnation container 150 in which the silica precursor 40 is stored to impregnate the silica precursor 40 into the surface of the fiber sheet 10.

Here, the silica precursor 40 is prepared by mixing tetraethyl orthosilicate (TEOS) with ethanol. That is, 1.2 kg of TEOS and 2.7 kg of ethanol are provided in a reaction bath (not shown) to prepare the silica precursor 40.

The TEOS may use a solvent having high reactivity with water and be hydrolyzed to more improve reactivity. That is, the hydrolyzed TEOS and the ethanol may be mixed to obtain the silica sol having excellent reactivity.

(c) Silica Precursor Gelation Step

In the silica precursor gelation step (c), the gelling catalyst 50 is injected to the surface of the fiber sheet 10 in which the silica precursor transferred by the conveyor belt 160 is impregnated to gelate the silica precursor. Here, the gelling catalyst 50 is prepared by mixing ethanol with ammonia water ($NH_4OH$). That is, 0.5 kg of ethanol and 30 ml of ammonia water ($NH_4OH$) are mixed in the reaction bath (not shown) to prepare the gelling catalyst 50.

Thus, in the silica precursor gelation step (c), the prepared gelling catalyst 50 is injected into and stored in the catalyst supply member 170. Then, when the fiber sheet 10 is transferred up to a lower side of the catalyst supply member 170 by the conveyor belt 160, the gelling catalyst 50 is injected to the surface of the fiber sheet 10 through the catalyst supply member 170 to gradually gelate the silica precursor by the gelling catalyst 50.

Here, the catalyst supply member 170 may inject the stored gelling catalyst 50 at a preset rate to leave the gelling catalyst for a preset time and thereby to gelate the silica precursor. That is, the catalyst supply member 170 may inject the gelling catalyst 30 to the surface of the fiber sheet 10 at a rate of 0.035 L/min to 0.012 L/min and then leave the gelling catalyst 30 for 8 minutes to 12 minutes to gelate the silica precursor.

Particularly, the catalyst supply member 170 may uniformly adjust the gelation of the silica precursor by varying the injection rate of the gelling catalyst 50 according to density of the silica precursor 40 impregnated in the fiber sheet 10. That is, the more the density of the silica precursor increases, the injection rate of the gelling catalyst decreases to induce stable gelation of the silica precursor.

The silica precursor is collected while being wound in the form of the roll by the collection roller 190, and the collected fiber sheet 10 undergoes the aging step, the surface modifying step, and the drying step to complete the aerogel sheet. Here, a reaction container 200 is used.

Figure 3:
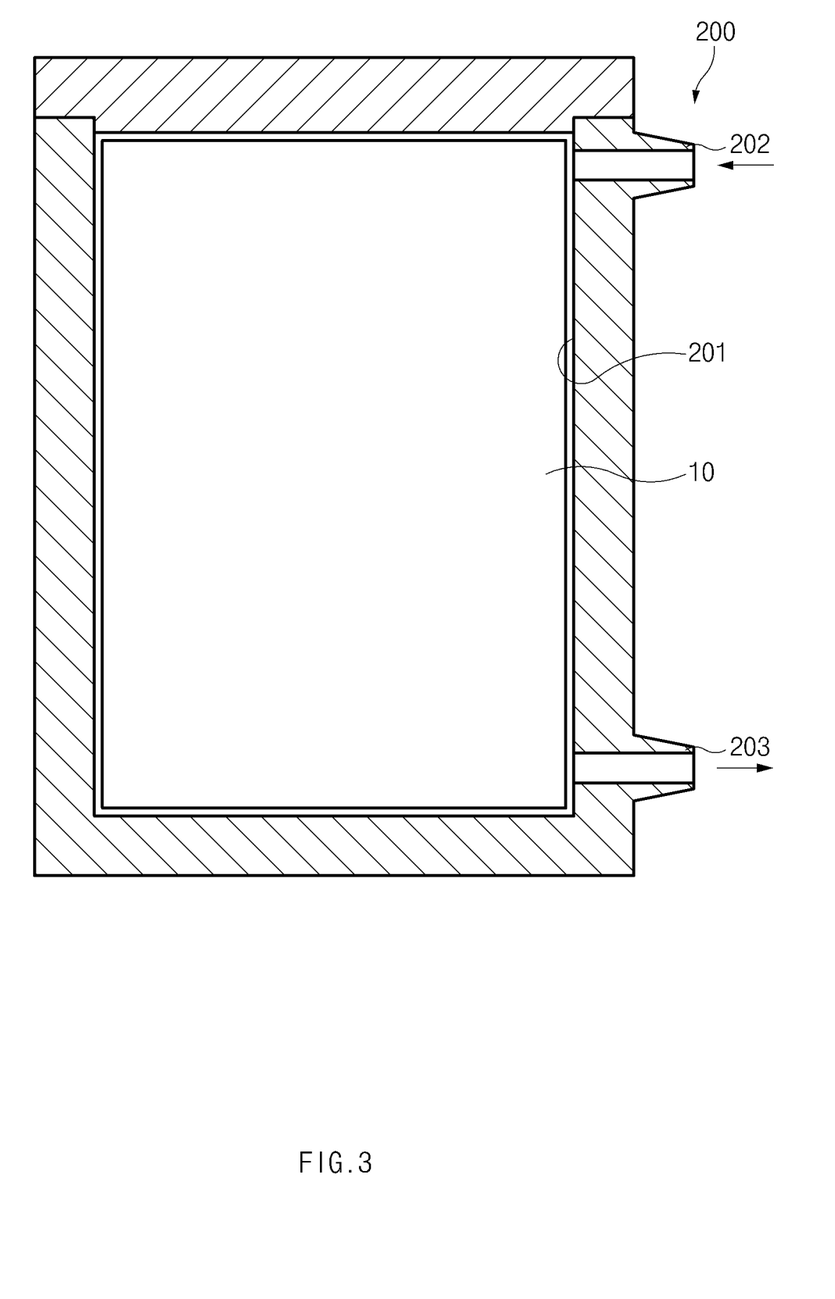
FIG. 3 is a view of a reaction container provided in the apparatus for manufacturing the aerogel sheet according to the present invention.

FIG. 3 is a view of the reaction container 200 according to the present invention.

That is, the reaction container 200 has an accommodation space 201 in which the fiber sheet 10 collected in the form of the roll is accommodated to be sealed. The reaction container 200 has one end in which an injection hole 202 connected to the accommodation space 201 is formed and the other end in which a discharge hole 203 connected to the accommodation space 201 is formed.

Hereinafter, the fiber sheet aging step (d), the fiber sheet surface modifying step (e), and the fiber sheet drying step (f) using the reaction container 200 will be described.

(d) Fiber Sheet Aging Step

In the fiber sheet aging step (d), the fiber sheet 10 in which the silica precursor is gelated is aged. That is, the fiber sheet 10 collected in the form of the roll in the step (c) is accommodated in the accommodation space 201 of the reaction container 200, and then, the fiber sheet 10 is aged for 50 minutes while the reaction container 200 is heated up to a temperature of 70° C. to uniformize tissues of the fiber sheet 10.

Here, in the fiber sheet aging step (d), the fiber sheet is left at room temperature (or a temperature of 25° C.) for 10 minutes before being aged in the reaction container 200 to perform the aging on the fiber sheet. That is, in the fiber sheet aging step (d), the fiber sheet 10 is left for 10 minutes to induce stable gelation of the silica precursor and perform the aging, thereby more uniformizing the tissues of the fiber sheet 10.

(e) Fiber Sheet Surface Modifying Step

In the fiber sheet surface modifying step (e), a coating solution is injected to the aged fiber sheet 10 to modify the surface of the fiber sheet 10. That is, in the fiber sheet surface modifying step (e), ethanol and ammonia water ($NH_4OH$) are mixed to prepare the coating solution. Then, the coating solution is injected into the accommodation space 201 through the injection hole 202 of the reaction container 200 in which the fiber sheet 10 is loaded to modify the surface of the fiber sheet 10. Here, the coating solution is injected with 1.6 times of the silica precursor impregnated into the surface of the fiber sheet in the step (b), and the aging is performed at a high temperature of 70° C. for one hour in the reaction container 200 to modify the surface of the fiber sheet 10 by using hexamethyldisilazane (HMDS).

(f) Fiber Sheet Drying Step

In the fiber sheet drying step (f), the fiber sheet 10 of which the surface is modified is dried to complete a silica gel sheet. Here, in the fiber sheet drying step (f), supercritical drying is performed in a state in which the fiber sheet 10 is accommodated in the reaction container 200. That is, the fiber sheet drying step (f) comprises a first drying step of injecting carbon dioxide at a rate of 70 L/min for ten minutes under environments of a temperature of 28° C. and a pressure of 70 bar to dry the fiber sheet 10 of which the surface is modified, a second drying step of raising to a temperature of 50° C. for 1 hour and 20 minutes to dry the fiber sheet 10, a third drying step of injecting carbon dioxide at a rate of 0.7 L/min for 20 minutes again under a temperature of 50° C. and a pressure of 150 bar to dry the fiber sheet 10, and a fourth drying step of injecting carbon dioxide at a rate of 0.7 L/min for 20 minutes after breaking for 20 minutes to dry the fiber sheet 10. The above-described drying steps may be performed to increase a drying rate of the fiber sheet 10.

In the third drying step of the fiber sheet drying step (f), ethanol is generated in the reaction container 200 by chemical reaction between the carbon dioxide and the fiber sheet 10, and the ethanol generated in the reaction container 200 is discharged through the discharge hole 203 and then is collected.

Also, the fiber sheet drying step (f) comprises a discharging step of discharging the carbon dioxide for 2 hours after the fourth drying step. Thus, a gradual environmental change is induced in the fiber sheet 10 to uniformize the tissues of the fiber sheet 10.

Figure 4:
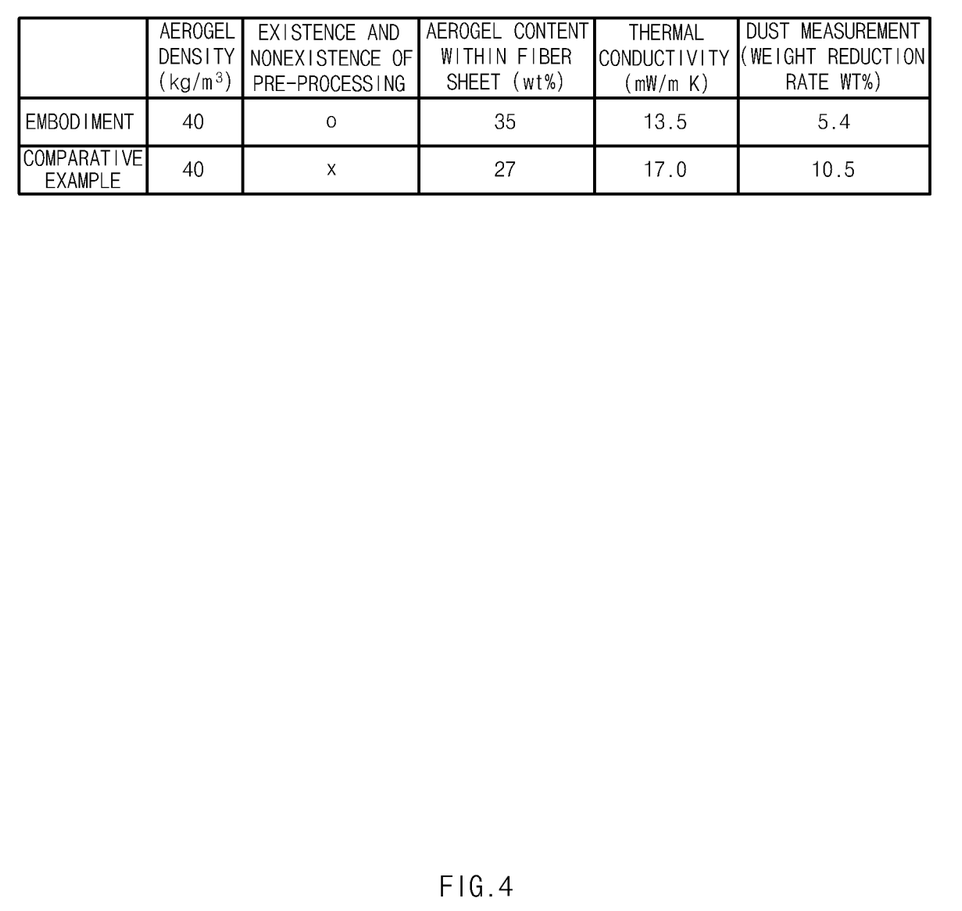
FIG. 4 is a table showing results obtained by comprising an embodiment according to the present invention with a comparative example according to the related art.

FIG. 4 is a table showing results obtained by comparing an embodiment according to the present invention with a comparative example according to the related art.

That is, referring to FIG. 4, it is confirmed that the aerogel sheet, on which the pre-processing is performed, according to an embodiment is significantly reduced in content of aerogel, thermal conductivity, and weight when compared to the aerogel sheet, on which the pre-processing is not performed, according to the related art.

Thus, in the method for manufacturing the aerogel sheet according to the present invention, the aerogel sheet having the uniform tissues, the high insulation and durability, and the uniform thickness may be obtained.

Accordingly, the scope of the present invention is defined by the appended claims rather than the foregoing description and the exemplary embodiments described therein.

Various modifications made within the meaning of an equivalent of the claims of the invention and within the claims are to be regarded to be in the scope of the present invention.

The invention claimed is:

1. A method for manufacturing an aerogel sheet, the method comprising:
   a step (a) of impregnating an acid solution into a fiber sheet to clean the fiber sheet yielding a cleaned fiber sheet, and impregnating a binder solution into the cleaned fiber sheet to manufacture a pre-processed fiber sheet, wherein an organic impregnation solution that is poly vinyl alcohol (PVA) and poly vinyl butyral (PVB) or an inorganic impregnation solution that is silica sol is used as the binder solution;
   a step (b) of impregnating a silica precursor into the pre-processed fiber sheet; and
   a step (c) of injecting a gelling catalyst into the fiber sheet into which the silica precursor is impregnated to gelate the silica precursor.

2. The method of claim 1, wherein, in the step (a), the fiber sheet is cleaned by using the acid solution while being dipped into a cleaning container in which the acid solution is stored, and the pre-processed sheet is manufactured while the fiber sheet that is cleaned by using the acid solution is dipped into a binder impregnation container in which the binder solution is stored.

3. The method of claim 1, wherein the step (a) further comprises a step of drying the fiber sheet into which the binder solution is impregnated.

4. The method of claim 1, wherein, in the step (b), tetraethyl orthosilicate (TEOS) and ethanol are mixed to prepare the silica precursor.

5. The method of claim 4, wherein the tetraethyl orthosilicate (TEOS) comprises hydrolyzed TEOS.

6. The method of claim 1, wherein, in the step (c), ethanol and ammonia water ($NH_4OH$) are mixed to prepare the gelling catalyst.

7. The method of claim 1, wherein, in the step (b), the pre-processed fiber sheet is dipped into a precursor impregnation container in which the silica precursor is stored to impregnate the silica precursor into the fiber sheet.

8. The method of claim 1, wherein the step (c) is performed within a conveyor belt that transfers the fiber sheet, in which the silica precursor is impregnated, from one side to the other side thereof.

9. The method of claim 8, wherein the conveyor belt comprises a scraper comprising a first scraper adjusting a thickness of the silica precursor injected to the surface of the pre-processed fiber sheet and a second scraper adjusting a thickness of the gelling catalyst injected to the surface of the fiber sheet into which the silica precursor is impregnated.

10. A method for manufacturing an aerogel sheet, the method comprising:
- a step (a) of impregnating an acid solution into a fiber sheet to clean the fiber sheet yielding a cleaned fiber sheet, and impregnating a binder solution into the cleaned fiber sheet to manufacture a pre-processed fiber sheet;
- a step (b) of impregnating a silica precursor into the pre-processed fiber sheet; and
- a step (c) of injecting a gelling catalyst into the surface of the fiber sheet, into which the silica precursor is impregnated, at a rate of 0.035 L/min to 0.012 L/min to leave the gelling catalyst for 8 minutes to 12 minutes and thereby to gelate the silica precursor.

11. A method for manufacturing an aerogel sheet, the method comprising:
- a step (a) of impregnating an acid solution into a fiber sheet to clean the fiber sheet yielding a cleaned fiber sheet, and impregnating a binder solution into the cleaned fiber sheet to manufacture a pre-processed fiber sheet;
- a step (b) of impregnating a silica precursor into the pre-processed fiber sheet;
- a step (c) of injecting a gelling catalyst into the fiber sheet into which the silica precursor is impregnated to gelate the silica precursor; and
- a step (d) of aging the fiber sheet in which the silica precursor is gelated for 50 minutes at a temperature of 70° C.

12. The method of claim 11, wherein, in the sheet aging step (d), the fiber sheet in which the silica precursor is gelated is additionally left at room temperature for 10 minutes to perform the aging.

13. The method of claim 11, further comprising after the step (d), a step (e) of injecting a coating solution to the aged fiber sheet to modify a surface of the fiber sheet.

14. The method of claim 13, further comprising after the step (e), a step (f) of drying the fiber sheet of which the surface is modified.

15. The method of claim 14, wherein the step (f) comprises a first drying step of injecting carbon dioxide at a rate of 70 L/min for ten minutes under environments of a temperature of 28° C. and a pressure of 70 bar to dry the fiber sheet of which the surface is modified, a second drying step of raising to a temperature of 50° C. for 1 hour and 20 minutes to dry the fiber sheet again, a third drying step of injecting carbon dioxide at a rate of 0.7 L/min for 20 minutes under a temperature of 50° C. and a pressure of 150 bar to dry the fiber sheet, and a fourth drying step of injecting carbon dioxide at a rate of 0.7 L/min for 20 minutes after breaking for 20 minutes to dry the fiber sheet.

16. The method of claim 15, wherein, in the third drying step of the step (f), the ethanol generated from the fiber sheet of which the surface is modified is collected while injecting the carbon dioxide.

17. The method of claim 15, wherein the step (f) further comprises a step of discharging the carbon dioxide for 2 hours after the fourth drying step.

* * * * *

UNITED STATES PATENT AND TRADEMARK OFFICE
CERTIFICATE OF CORRECTION

PATENT NO. : 10,696,557 B2
APPLICATION NO. : 15/736736
DATED : June 30, 2020
INVENTOR(S) : Kim et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 203 days.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*